US010277061B1

(12) United States Patent
Kerselaers

(10) Patent No.: US 10,277,061 B1
(45) Date of Patent: Apr. 30, 2019

(54) WIRELESS DEVICE

(71) Applicant: NXP B.V., Eindhoven (NL)

(72) Inventor: Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/915,561

(22) Filed: Mar. 8, 2018

(51) Int. Cl.
| H04B 1/00 | (2006.01) |
| H04B 5/00 | (2006.01) |
| H02J 7/02 | (2016.01) |
| H02J 50/20 | (2016.01) |
| H02J 50/12 | (2016.01) |
| H04W 4/80 | (2018.01) |

(52) U.S. Cl.
CPC .............. H02J 7/025 (2013.01); H02J 50/12 (2016.02); H02J 50/20 (2016.02); H04B 1/006 (2013.01); H04B 5/0037 (2013.01); H04W 4/80 (2018.02)

(58) Field of Classification Search
CPC ...................................................... H02J 7/025
See application file for complete search history.

(56) References Cited

U.S. PATENT DOCUMENTS

| 7,548,040 | B2 | 6/2009 | Lee et al. | |
| 8,731,116 | B2 | 5/2014 | Norconk et al. | |
| 9,001,881 | B2 | 4/2015 | Okamura et al. | |
| 9,590,445 | B2 | 3/2017 | Aerts et al. | |
| 9,602,955 | B2 | 3/2017 | Cronie et al. | |
| 9,923,584 | B2 * | 3/2018 | Irish | H04B 1/1027 |
| 2010/0214177 | A1 | 8/2010 | Parsche | |
| 2012/0056485 | A1 * | 3/2012 | Haruyama | H02J 5/005 307/104 |
| 2012/0235508 | A1 * | 9/2012 | Ichikawa | H02J 50/40 307/104 |
| 2013/0260676 | A1 * | 10/2013 | Singh | H04B 5/0037 455/41.1 |
| 2014/0179223 | A1 * | 6/2014 | Sessink | G07C 9/00309 455/41.1 |
| 2014/0312709 | A1 * | 10/2014 | Nakano | H02J 5/005 307/104 |
| 2016/0156231 | A1 * | 6/2016 | Shibuya | H04B 5/0037 455/82 |
| 2017/0093454 | A1 | 3/2017 | Chawan et al. | |
| 2017/0104355 | A1 | 4/2017 | Barmoav et al. | |

OTHER PUBLICATIONS

Ha, Sohmyung et al; "Energy-Recycling Integrated 6.78-Mbps Data 6.3-mW Power Telemetry over a Single 13.56-MHz Inductive Link"; IEEE Symposium on VLSI Circuits Digest of Technical Papers; Honolulu, HI, USA; 2 pages. (Jun. 10-13, 2014).

Li, Xing et al; "A 13.56MHz Wireless Power Transfer System with Reconfigurable Resonant Regulating Rectifier and Wireless Power Control for Implantable Medical Devices"; IEEE Journal of Solid-State Circuits, vol. 50, Issue 4; pp. 978-989 (Apr. 2015).

* cited by examiner

Primary Examiner — Wen W Huang

(57) ABSTRACT

One example discloses a combination wireless charging and communications device, including: a series reactance; wherein the series reactance is configured to be coupled in series between an antenna and a charging circuit; wherein the series reactance is configured to conduct a charging current between the antenna and the charging circuit; a parallel reactance; wherein the parallel reactance is configured to be coupled in parallel with the antenna and a communications circuit; and wherein the parallel reactance is configured to conduct a communications voltage between the antenna and the communications circuit.

14 Claims, 2 Drawing Sheets

WIRELESS DEVICE

The present specification relates to systems, methods, apparatuses, devices, articles of manufacture and instructions for both wireless communications and charging.

SUMMARY

According to an example embodiment, a combination wireless charging and communications device, comprising: a series reactance; wherein the series reactance is configured to be coupled in series between an antenna and a charging circuit; wherein the series reactance is configured to conduct a charging current between the antenna and the charging circuit; a parallel reactance; wherein the parallel reactance is configured to be coupled in parallel with the antenna and a communications circuit; and wherein the parallel reactance is configured to conduct a communications voltage between the antenna and the communications circuit.

In another example embodiment, the communications voltage at the communications circuit is configured to change based on a change in the parallel reactance; and the charging current at the charging circuit is configured to change based on a change in the series reactance.

In another example embodiment, the antenna is configured to carry the charging current at a first frequency; and the antenna is configured to carry the communications voltage at a second frequency.

In another example embodiment, the first frequency is centered substantially at 13.6 MHz, and the second frequency is centered substantially at 10.6 MHz.

In another example embodiment, the wireless charging and communications device is configured to alternate between receiving the charging current through the series reactance and receiving the communications voltage through the parallel reactance.

In another example embodiment, further comprising a switch coupled to the communications circuit and the charging circuit; wherein the switch is configured to place the wireless charging and communications device into a charging mode for receiving the charging current, or a communications mode for receiving the communications voltage.

In another example embodiment, further comprising the antenna; wherein the antenna is a near-field antenna.

In another example embodiment, further comprising the antenna; wherein the antenna is an RF antenna.

In another example embodiment, further comprising the antenna; wherein the antenna is responsive to at least one of: a magnetic field, an electric field, or an electromagnetic field.

In another example embodiment, further comprising the communications circuit; wherein the communications circuit is configured to generate and receive the communications voltage at the second frequency.

In another example embodiment, further comprising the charging circuit; wherein the charging circuit includes a power port; and wherein the charging circuit is configured to receive energy from the power port and generate the charging current at the first frequency.

In another example embodiment, further comprising the charging circuit; wherein the charging circuit includes a power port; and wherein the charging circuit is configured to receive the charging current at the first frequency and transfer energy to the power port.

In another example embodiment, the power port is configured to be coupled to at least one of: a load, a battery, or a mains power source.

In another example embodiment, the wireless charging and communications device is embedded in at least one of: a wearable device, a hearing aid, an earbud, a telematics device, a cellular device, or a road-side communications device.

According to an example embodiment, a wearable device, comprising: a series reactance; wherein the series reactance is configured to be coupled in series between an antenna and a charging circuit; wherein the series reactance is configured to conduct a charging current between the antenna and the charging circuit; a parallel reactance; wherein the parallel reactance is configured to be coupled in parallel with the antenna and a communications circuit; and wherein the parallel reactance is configured to conduct a communications voltage between the antenna and the communications circuit.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
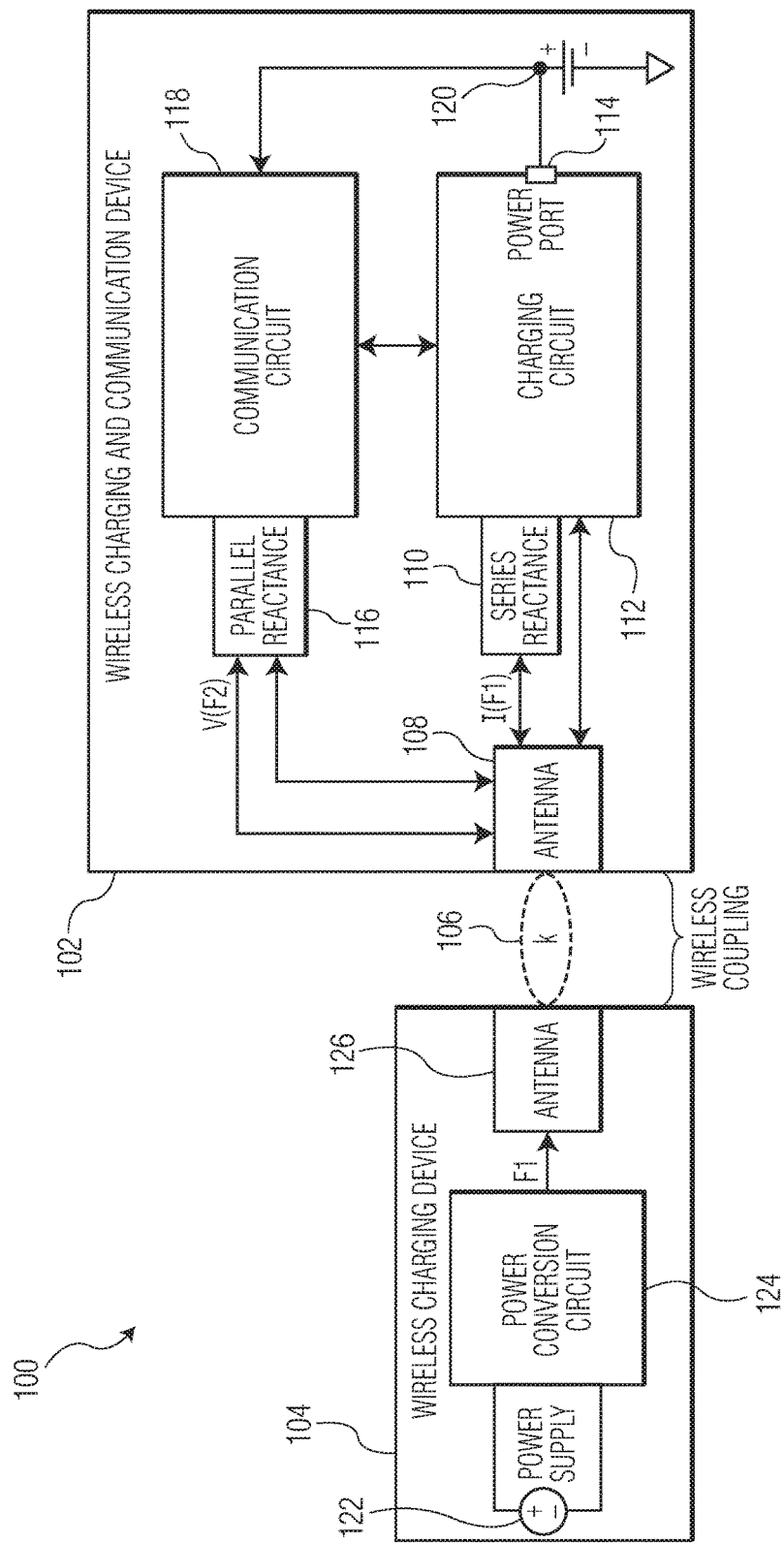
FIG. 1 is a first example system for wireless charging and communication.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless wearable devices can communicate with other wireless devices as part of a network at either near-field or RF frequencies, perhaps creating Body Networks of multiple wireless wearable devices.

For example, hearing aids can wirelessly communicate with each other or with another device not worn by the user; and earbuds that can wireless communicate with each other or with another device not worn by the user.

The wireless communication can be by means of analogue or digital modulation techniques and can contain data or audio information. In case of earbuds and hearing aids a combination of data and audio information is communicated between the devices. The audio can be high quality audio, like CD quality or can be speech quality. In the latter case a higher bandwidth of the communication channel is required.

Wearable devices can also be worn by a user in environments where the device is then able to communicate with other persons, cars and bicycles according to road and traffic Car2X standards.

While wearable devices discussed herein may communicate by means of near field magnetic fields, in other example embodiments such wearable devices make use of both magnetic and electric near fields or RF to communicate with each other.

Wearable near-field devices can be small and use a battery to supply their electronics, however in an always on state they can consume substantial amounts of power over time. Wirelessly charging such batteries (i.e. without making electrical contact with a charger unit) is beneficial.

Some example wireless devices may include two coils. One for communications (e.g. when being worn or carried) and another for close distance wireless charging (e.g. in a charging cradle).

Other example wireless devices use a single coil operating at a single frequency for both communications and charging. Such single coil systems incur tradeoffs between selecting a frequency which does not cause undue interference while still transferring sufficient energy during charging.

For example, 13.6 MHz ISM is used for many applications that may otherwise cause interference. To avoid such interference, wireless wearable devices such as earbuds, hearing aids, etc. operate at 10.6 MHz. However, efficient wireless charging at 10.6 MHz would require a much larger magnetic field strength than required for communication which would be above the legal emission restrictions of this non-ISM band. Such the magnetic fields at 10.6 MHz however are heavily restricted unlike in the 13.6 MHz ISM band. Reducing the magnetic field strength at 10.6 MHz to legal levels would in many cases result in inordinately long charging times.

Now discussed are circuits and protocols for using a single antenna for both wireless communications and wireless charging, but at different frequencies. A first frequency (F1) is used in a wireless charging mode and a second frequency (F2) is used in a wireless communications mode.

FIG. 1 is a first example 100 system for wireless charging and communication. The first example 100 shows a wireless charging and communications device 102, a wireless charging device 104, and a wireless coupling 106 between 102 and 104 having a coupling coefficient "k".

The wireless charging and communications device 102 includes an antenna 108, a series reactance 110, a charging circuit 112 having a power port 114, a parallel reactance 116, a communications circuit 118, and a power storage device 120 (e.g. a battery).

Charging current I(F1) flows through the wireless charging and communications device 102 at a first frequency F1 and communications voltage V(F2) occurs in the wireless charging and communications device 102 at a second frequency F2. In some example embodiments both frequencies F1 and F2 are substantially, if not exactly, the same.

In the combination wireless charging and communications device 102, the series reactance 110 is configured to be coupled in series between antenna 108 and the charging circuit 112. The series reactance 110 is configured to conduct the charging current at the first frequency I(F1) between the antenna 108 and the charging circuit 112.

The parallel reactance 116 is configured to be coupled in parallel with the antenna 108 and the communications circuit 118. The parallel reactance 116 is configured to conduct the communications voltage at the second frequency V(F2) between the antenna 108 and the communications circuit 118.

The communications voltage at second frequency V(F2) at the communications circuit 118 is configured to change based on a change in the parallel reactance 116, and the charging current at first frequency I(F1) at the charging circuit 112 is configured to change based on a change in the series reactance 110.

Thus the antenna 108 is configured to carry both the charging current at the first frequency I(F1), and the communications voltage at the second frequency V(F2). In some example embodiments the first frequency is centered substantially at 13.6 MHz, and the second frequency is centered substantially at 10.6 MHz.

In other example embodiments the wireless charging and communications device is configured to alternate between receiving the charging current at first frequency I(F1) through the series reactance 110 and receiving the communications voltage at second frequency V(F2) through the parallel reactance 116.

The antenna 108 can be of various types such as a near-field antenna or an RF antenna, and be responsive to at least one of: a magnetic field, an electric field, or an electromagnetic field. This is discussed further below.

In various example operating modes, the communications circuit 118 can be configured to generate and/or receive the communications voltage at the second frequency V(F2).

Also in various example embodiments, the power port 114 in the charging circuit 112 can be configured to either: receive energy from the power port 114 and generate the charging current at the first frequency I(F1) which is then transmitted on the antenna 108 to another device (not shown); or receive the charging current at the first frequency I(F1) from the antenna 108 and transfer energy to the power port 114.

Thus the power port 114 can be coupled to either: another load (e.g. the communications circuit 118), a battery, or a mains power source.

The wireless communication signals to and/or from the communications circuit 118 can be audio or data digital or analogue modulated on a communication frequency.

In various example embodiments the wireless charging and communications device 102 can be embedded in: a wearable device, a hearing aid, an earbud, a telematics device, a cellular device, or a road-side communications device.

The wireless charging device 104 is shown as an example power source (e.g. in a wireless charger cradle) in a configuration where the wireless charging device 104 is transferring energy to the wireless charging and communications device 102. Other wireless charging and communications devices that could be communicating with the wireless charging and communications device 102 are not shown.

The wireless charging device 104 includes a power supply 122 (e.g. from a USB port), a power conversion circuit 124 (e.g. AC/DC to Wireless), and an antenna 126. The power conversion circuit 124 (e.g. a a DC/RF convertor) converts the supply source power 122 into a wireless current signal output over the antenna 126 at the first frequency (F1) to wirelessly charge any other devices (e.g. such as 102) that are within range.

The wireless coupling 106 between the antenna 126 and the antenna 108 is wireless and not galvanic. The coupling is established by antenna 126 and 108. In one example embodiment, both antennas 126, 108 are close together so that energy is efficiently transmitted and captured.

Both antennas 126 and 108 are electromagnetically coupled to each other. The coupling can be expressed by a coupling coefficient "k". This coupling coefficient "k" in this example embodiment is different from just a magnetic coupling factor since it also includes the coupling effects of the electric field.

The coupling coefficient "k" his herein defined as:

$$k = Va2/Va1$$

where: Va1=the voltage at antenna 126; and
Va2=the voltage at antenna 108 when the antenna is not loaded (not connected to any load)
"k" is a maximum 1 and in practice k<1.

To transfer wireless energy efficiently from the power supply 122 to the power storage device 120 (e.g. a battery), the coupling coefficient "k" should be sufficient high (i.e. as close to "1" as possible). The coupling coefficient "k" is affected by various transmission losses in various circuits, but can be optimized by resonating one or both antennas 126 and 108 to the first frequency F1.

In various example embodiments, the wireless charging frequency F1 and the communications frequency F2 are each individually optimized for their functionality and to meet various legal requirements. For example, wireless charging (e.g. energy transfer) can be set to the 13.6 MHz ISM frequency band, while wireless communication can be set to a frequency band with lower expected interference, such as 10.6 MHz.

Other frequency combinations are possible depending upon the application. F1 and F2 in many example embodiments are not the same frequency.

In applications where the antennas 126, 108 are responsive to magnetic near fields (i.e. coupling between the antennas is mainly magnetic) loop and/or coil antennas can be used.

In applications where the antennas 126, 108 are responsive to electric near fields (i.e. coupling between the antennas is mainly electric, like in a capacitor) dipole and/or monopole antennas can be used.

In applications where the antennas 126, 108 are responsive to both electric and magnetic near fields, dipoles and/or monopoles combined with loops and/or coils can be used.

In applications where the antennas 126, 108 are responsive to RF electromagnetic fields, an RF plane wave antenna can be used.

In the example 100 embodiment shown in FIG. 1, only the wireless charging device 104 is shown transferring energy to the wireless charging and communications device 102. Not shown are other wireless charging and communication devices (e.g. earbuds, smartphones, cellular base stations, etc.) that can transmit and/or receive communication signals with wireless charging and communications device 102 through the antenna 108.

Figure 2:
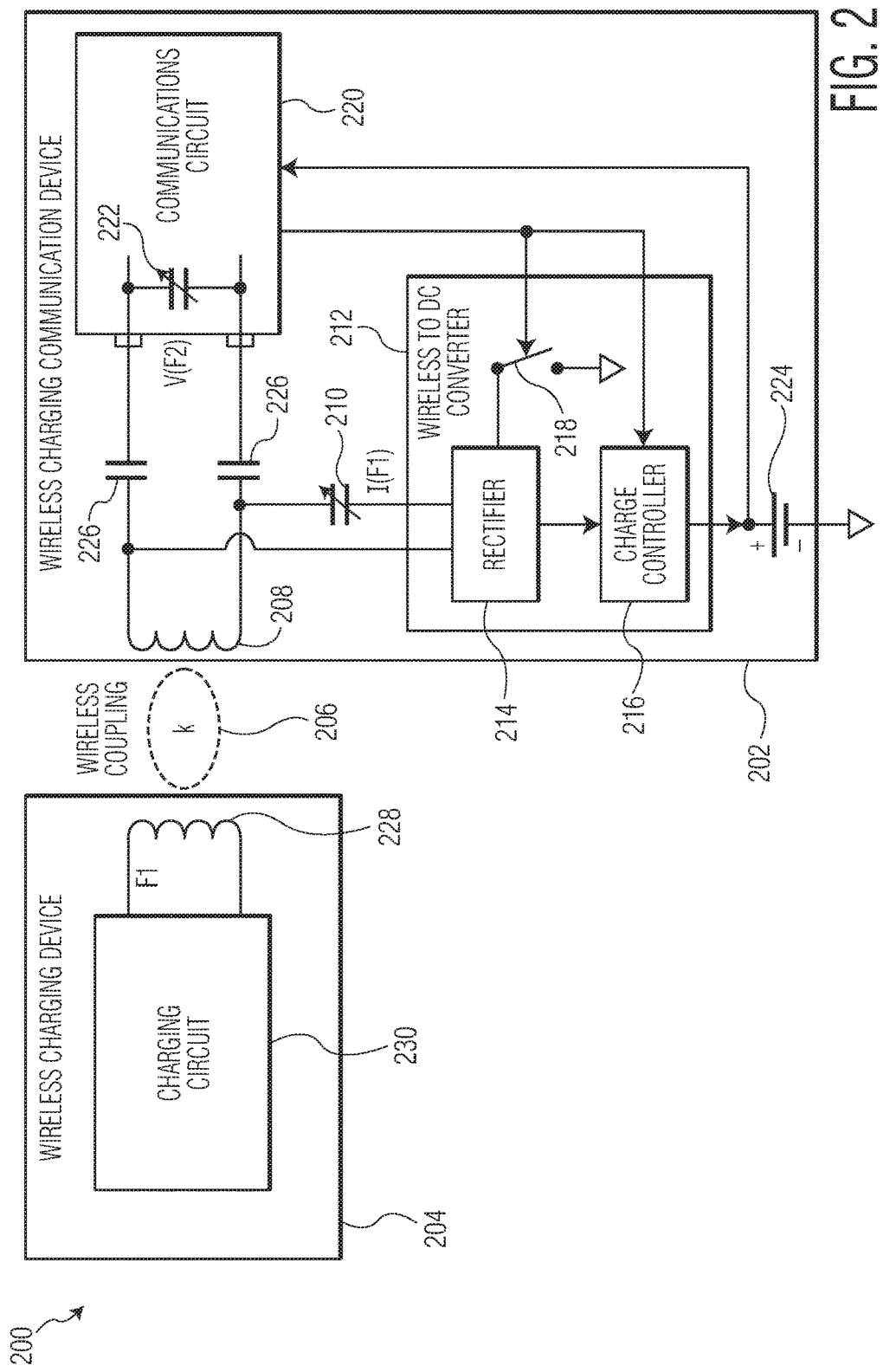
FIG. 2 is a second example system for wireless charging and communication.

FIG. 2 is a second example 200 system for wireless charging and communication. The second example 200 shows a wireless charging and communications device 202, a wireless charging device 204, and a wireless coupling 206 between 202 and 204 having a coupling coefficient "k".

The wireless charging and communications device 202 includes an antenna 208 (e.g. coil), a series reactance 210, a wireless to DC converter 212, a communications circuit 220, a parallel reactance 222 (e.g. tuning capacitor), a power storage device 224 (e.g. battery), and coupling capacitors 226. The wireless to DC converter 212 include a rectifier 214, a charge controller 216, and a switch 218.

The wireless charging device 204 includes an antenna 228 and a charging circuit 230 (e.g. a DC/RF converter).

Charging current I(F1) flows through the wireless charging and communications device 202 at a first frequency F1 and communications voltage V(F2) occurs in the wireless charging and communications device 202 at a second frequency F2.

While the antennas 228, 208 are shown as coils, as discussed earlier these antennas 228, 208 can be of many different types. The antenna 208 is coupled through capacitors 226 to the communication circuit 220.

The parallel reactance 222 (e.g. a variable/tunable capacitor bank) is coupled in parallel between the antenna 208 and the communications circuit 220. The communications circuit 220 is configured to adjust the parallel reactance 222, and a resistor bank (not shown), to place a receiver, within the communications circuit 220, in resonance with the antenna 208 at the second frequency F2. This enables a "parallel resonance" with the antenna 208 for maximum communications signal strength.

By varying the overall capacitance of the capacitor bank 222 the antenna 208 can be tuned to resonate at the second frequency F2.

The communication circuit 220 in various examples also includes a power amplifier (PA) for transmitting signals to, and a low noise amplifier (LNA) for receiving signals from, the antenna 208. Voltage at such an LNA input is maximized when the quality factor (Q) is sufficient high, for example 20 to 30:

$$Q = F2/BW$$

where:
F2=communication frequency; and
BW=−3 dB bandwidth of the antenna circuit
The quality factor of the antenna 208 in some example embodiments can be not too high if a defined bandwidth (BW) is required to pass the communication signals, for example 400 KHz.

The series reactance 210 (e.g. tunable capacitor) is coupled in series with the wireless/DC convertor 212. This enables a "series resonance" to be achieved with the antenna 208 for maximum energy transfer.

The series reactance 210 is selected such that the antenna 208 and capacitor 210 combination resonates at the first frequency (F1) generated by the charging circuit 230 and thus charging current is most efficiently passed to the wireless/DC convertor 212 for charging the power storage device 224. While FIG. 2 shows the series reactance 210 in one path, such series reactance 210 can alternately be split over both circuit paths to the wireless/DC convertor 212.

In some example embodiments, the wireless to DC converter 210 path has a much lower quality factor than the communications circuit 212 due to the load which is in series with the antenna. In various example embodiments tuning of the series reactance 210 does not occur at a same time as tuning the parallel reactance 222.

To maximize charging current from the antenna 208 the antenna's 208 reactance (X) is tuned out by series reactance 210 (i.e. a series tuning system) such that each's reactance has a same amplitude but opposite polarity at resonance frequency F1.

$$X\text{antenna } 208 = -X\text{capacitor } 210$$

Where:
Xantenna 208=reactance of antenna 208
Xcapacitor 210=reactance of capacitor 210
This maximized charging current is:

$$I = U\text{induced}/(R\text{loss} + R\text{load})$$

Where:
Uinduced=the voltage induced into antenna 208
Rloss=the loss of antenna 208 and rectifier 214
Rload=load In various example embodiments, the wireless/DC convertor 212 may include the rectifier 214 to rectify the wireless signal, the charge controller 216, and/or the switch 218.

The switch 218 is coupled to the communications circuit 220 and the wireless to DC converter 212. In some example embodiments, the switch is configured to place the wireless charging and communications device 202 into either the charging mode for receiving the charging current at first frequency I(F1), or the communications mode for receiving the communications voltage at second frequency V(F2).

Some example embodiments do not include the switch 218. In this configuration the frequency used for the communication (F1) and the frequency used for the wireless charging is the same. The series reactance 210 increases efficiency in the charging mode.

The wireless to DC converter 212 may or may not include the charge controller 216 as well.

The converted energy from the wireless to DC converter 212 is then used for charging the power storage device 224 (e.g. a rechargeable battery).

Various systems, such as the wireless charging and communications device 102 just discussed, can host these instructions. Such systems can include an input/output data interface, a processor, a storage device, and a non-transient machine-readable storage medium. The machine-readable storage medium includes the instructions which control how the processor receives input data and transforms the input data into output data, using data within the storage device. The machine-readable storage medium in an alternate example embodiment is a non-transient computer-readable storage medium. In other example embodiments the set of instructions described above can be implemented either using logic gates, application specific chips, firmware, as well as other hardware forms.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A combination wireless charging and communications device, comprising:
   a series reactance;
   wherein the series reactance is configured to be coupled in series between an antenna and a charging circuit;
   wherein the series reactance is configured to conduct a charging current between the antenna and the charging circuit;
   a parallel reactance;
   wherein the parallel reactance is configured to be coupled in parallel with the antenna and a communications circuit;
   wherein the parallel reactance is configured to conduct a communications voltage between the antenna and the communications circuit;
   wherein the antenna is configured to carry the charging current at a first frequency;
   wherein the antenna is configured to carry the communications voltage at a second frequency; and
   wherein the series reactance and the parallel reactance are configured to simultaneously receive both the first frequency and the second frequency.

2. The device of claim 1:
   wherein the communications voltage at the communications circuit is configured to change based on a change in the parallel reactance; and
   wherein the charging current at the charging circuit is configured to change based on a change in the series reactance.

3. The device of claim 1:
   wherein the first frequency is centered substantially at 13.6 MHz, and the second frequency is centered substantially at 10.6 MHz.

4. The device of claim 1:
   wherein the wireless charging and communications device is configured to alternate between receiving the charging current through the series reactance and receiving the communications voltage through the parallel reactance.

5. The device of claim 1:
further comprising a switch coupled to the communications circuit and the charging circuit;
wherein the switch is configured to place the wireless charging and communications device into a charging mode for receiving the charging current, or a communications mode for receiving the communications voltage.

6. The device of claim 1:
further comprising the antenna;
wherein the antenna is a near-field antenna.

7. The device of claim 1:
further comprising the antenna;
wherein the antenna is an RF antenna.

8. The device of claim 1:
further comprising the antenna;
wherein the antenna is responsive to at least one of: a magnetic field, an electric field, or an electromagnetic field.

9. The device of claim 1:
further comprising the communications circuit;
wherein the communications circuit is configured to generate and receive the communications voltage at the second frequency.

10. The device of claim 1:
further comprising the charging circuit;
wherein the charging circuit includes a power port; and
wherein the charging circuit is configured to receive energy from the power port and generate the charging current at the first frequency.

11. The device of claim 1:
further comprising the charging circuit;
wherein the charging circuit includes a power port; and
wherein the charging circuit is configured to receive the charging current at the first frequency and transfer energy to the power port.

12. The device of claim 11:
wherein the power port is configured to be coupled to at least one of: a load, a battery, or a mains power source.

13. The device of claim 1:
wherein the wireless charging and communications device is embedded in at least one of: a wearable device, a hearing aid, an earbud, a telematics device, a cellular device, or a road-side communications device.

14. A wearable device, comprising:
a series reactance;
wherein the series reactance is configured to be coupled in series between an antenna and a charging circuit;
wherein the series reactance is configured to conduct a charging current between the antenna and the charging circuit;
a parallel reactance;
wherein the parallel reactance is configured to be coupled in parallel with the antenna and a communications circuit;
wherein the parallel reactance is configured to conduct a communications voltage between the antenna and the communications circuit;
wherein the antenna is configured to carry the charging current at a first frequency;
wherein the antenna is configured to carry the communications voltage at a second frequency; and
wherein the series reactance and the parallel reactance are configured to simultaneously receive both the first frequency and the second frequency.

* * * * *